(12) United States Patent
Jasper et al.

(10) Patent No.: US 6,201,955 B1
(45) Date of Patent: Mar. 13, 2001

(54) METHOD AND APPARATUS FOR RECEIVING A RADIO FREQUENCY SIGNAL USING A PLURALITY OF ANTENNAS

(75) Inventors: Steven C. Jasper, Hoffman Estates; Isam R. Makhlouf, Morton Grove, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/087,192

(22) Filed: May 29, 1998

(51) Int. Cl.[7] ........................................... H04Q 7/20
(52) U.S. Cl. ..................................... 455/277.2; 455/276.1
(58) Field of Search ............................ 455/277.1, 277.2, 455/276.1, 278.1; 342/382, 383

(56) References Cited

U.S. PATENT DOCUMENTS

| | | | |
|---|---|---|---|
| 4,497,067 | * 1/1985 | Namiki | 455/276.1 |
| 5,028,931 | * 7/1991 | Ward | 342/383 |
| 5,260,707 | * 11/1993 | Goldman | 455/278.1 |
| 5,561,673 | * 10/1996 | Takai et al. | 455/277.2 |

\* cited by examiner

Primary Examiner—Daniel S. Hunter
Assistant Examiner—Myron K. Wyche
(74) Attorney, Agent, or Firm—Steven A. May; Jeffrey K. Jacobs (57) ABSTRACT

An antenna array portion of a communication device receives a desired signal and an interfering signal. The unweighted desired and interfering signals from a first antenna (302) are then combined in a summer (308) with weighted versions of the signals from a second antenna (304) to produce a received RF signal (312). The signal-to-noise ratio (SNR) of the received RF signal (312) is then estimated using a spectral analysis technique. This estimate, along with the complex weights applied to the signal from the second antenna, is then stored. Utilizing feedback and a methodology for searching through a range of sets of complex weights, the weights optimizing the SNR are determined and used to weight subsequent signals from the second antenna. In this way the antenna array's gain pattern is adjusted to maximize the SNR of the desired signal

10 Claims, 4 Drawing Sheets

METHOD AND APPARATUS FOR RECEIVING A RADIO FREQUENCY SIGNAL USING A PLURALITY OF ANTENNAS

FIELD OF THE INVENTION

The present invention relates generally to communication devices, and in particular to the antenna and receiver portions of a communication device.

BACKGROUND OF THE INVENTION

The evolution of digital wireless communications has resulted in an array of communication devices that can wirelessly communicate both voice and data information. Among such products are handsets that are being marketed as today as personal communication systems. Such digital handsets may be used not merely for traditional telephony or two-way radio voice communications but also as radio frequency (RF) modems to wirelessly transmit or receive data communications.

One RF modem-type application of these handsets, or other digital wireless communication device, is to connect a handset or device to a data port of a personal computer and to use the handset or device to transmit data from the computer or to receive data transmissions that are broadcast to the computer. An example of such a use could be a utility company employee with a laptop computer transmitting information back to a central office from a remote location in the field and in turn receiving data or other communications from that central office. He could also wirelessly correspond with others and obtain whatever informational assistance he might need without ever having to leave the location at which he is working. In such an application, the wireless modem receives data from the personal computer through its interface with the computer. The modem then modulates that data into an RF signal. Once modulated, the data is then wirelessly transmitted by the modem. The wireless modem is also capable of receiving an RF signal that has been broadcast wirelessly from another data source, demodulating that RF signal, recreating the data that had been sent by the originating data source, and then transmitting that data to the personal computer to which that modem is connected.

A problem presented by such an application is wideband near-field electromagnetic interference that is generated by a personal computer. This interference can cause unacceptable degradation of the RF signal quality if a wireless RF modem is being used. One method of combating this problem is to use two-antenna diversity. Two-antenna diversity uses two antennas to receive a signal and then applies an optimization technique to improve the quality of the received signal over the performance that would be afforded by the use of a single antenna.

One of the simplest forms of two-antenna diversity is two-antenna selection diversity. As its name implies, this method involves selecting one of two antennas as the antenna that will be utilized as the receptor for a particular communication. There are several methods of making that selection. One involves choosing the antenna that has the highest received power. A major drawback to such a system is that it fails to discriminate between signal and interference power. To overcome that problem, J. C. Chang and N. R. Sollenberger proposed in "Burst Coherent Demodulation with Combined Symbol Timing, Frequency Offset Estimation, and Diversity Selection," *IEEE Transactions on Communications,* Vol. 39, No. 7, July 1991, using a system that indirectly analyzes the clarity, or average opening, of the eye pattern in a QPSK (Quadrature Phase Shift Keying) digital modulation scheme. QPSK is one of many modulation schemes by which digital information is impressed upon an RF carrier by modulation of the carrier's amplitude, frequency, and/or phase. One can represent these modulation schemes as combinations of particular individual points, or constellations, in a complex two-dimensional plane, each point, or symbol, representing one or more data bits and each point being defined by its amplitude and phase location in the complex plane. When an RF carrier is demodulated and sampled at its optimum sampling time, each sample should yield an amplitude and phase measurement that maps to one of the points predesignated by that modulation scheme. Interfering signals and noise can introduce variations in these amplitude and phase measurements, moving the sampled point away from the predesignated points and inserting ambiguity into the determination of which symbol was intended. The eye pattern is a complex plane representation of these measured samples, and the clarity of the eye pattern is an indication of the degree of precision by which the sampled points can be mapped to the predesignated symbols.

In general terms, Chang and Sollenberger propose choosing the antenna that produced the clearest eye pattern. However, they had to come up with a system to estimate its clarity since it would be impractical to actually observe the eye pattern. Their system searches for the optimal sampling point of the signal from an antenna by taking K (k=1, . . . , K) samples of each of N (n=1, . . . , N) symbols in a data burst (a string of symbols). These samples are then split into an in-phase component (I(n,k)) and a quadrature component (Q(n,k)) and mapped into vectors in the complex (I,Q) plane. The vectors from the kth sample of each of the N symbols are then added together to create K vector sums (of N vectors each). The ideal sampling point for that signal is then determined to be the sampling point that results in the maximum vector sum magnitude. This sampling point gives, on average, the highest "signal-to-impairment ratio (maximum eye-opening)" and the magnitude of its vector sum is a good measure of the quality of the signal from that antenna, according to Chang and Sollenberger.

Figure 1:
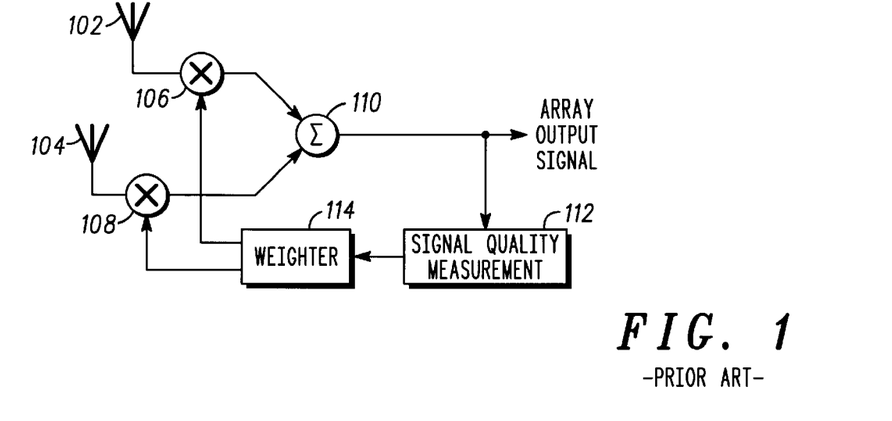
FIG. 1 is a block diagram illustration of a typical adaptive two-antenna array.
Figure 2:
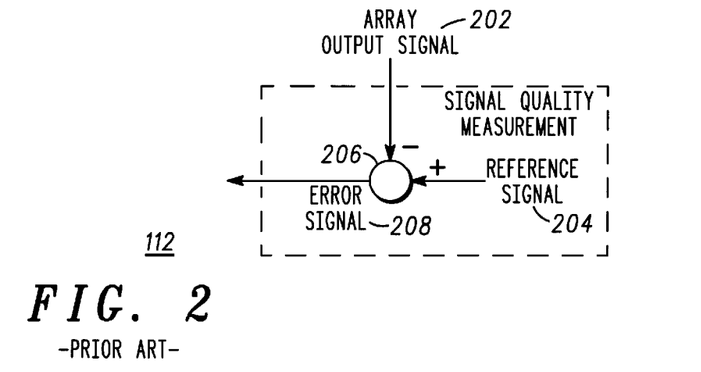
FIG. 2 is a block diagram illustration of a typical signal quality measurement technique for an adaptive antenna array.

Further improvement in the performance of the diversity system can be obtained by combining the signals from the two antennas rather than just selecting one or the other as the receptor. Amplitude and phase adjustments may be made to the signal from each antenna, or element, before the signals are combined. An adaptive antenna array is a diversity system that can make these adjustments and change its pattern in response to changes in the signal environment, seeking to optimize signal quality at the array output through a system of feedback control. Such systems are discussed in *Adaptive Antennas, Concepts and Performance,* by R. T. Compton, Jr., published by Prentice-Hall, Englewood Cliffs, N.J., 1988. A block diagram of a typical adaptive two-antenna array is shown in FIG. 1. The adaptive antenna array includes two antennas, 102 and 104, a summer 110, a signal quality measurement block 112, a weighter 114, and mixers 106 and 108 which are located between each of the antennas 102 and 104 and their respective inputs to the summer 110. In these systems, complex weights (amplitude and phase) set by the weighter 114 are applied in the mixers 106 and 108 to the signals from both antennas 102 and 104 before these signals are combined in the summer 110. After combining there is some measure of the quality of the received signal, and via a system of feedback control these weights are readjusted until the quality measurements are optimized. One method of weight optimization discussed by Compton is based on a minimum mean square error concept. A block diagram illustration of a quality measurement block 112 utilizing this concept is shown in FIG. 2. The receiver has a reference signal 204 to which it compares a correlated array output signal 202. An error signal 208 is generated and the weighter 114 adjusts the weights to minimize this error signal 208. Compton also discusses adjusting the weights to maximize the ratio of desired signal power to undesired interference plus noise power (SINR) at the output of the array but has no proposal of how to go about measuring this. See also "Signal Acquisition and Tracking with Adaptive Arrays in the Digital Mobile Radio System IS-54 with Flat Fading," authored by J. H. Winters, in the November 1993 issue of *IEEE Transactions on Vehicular Technology*, Vol. 42, No. 4, pp. 377–384 (Winters proposes using the sequence of symbols in a frame that are sent for synchronization purposes as the desired signal, comparing that sequence to a reference signal consisting of the known synchronization sequence in the receiver, and then using a minimum mean square error algorithm to determine the appropriate complex weights).

One known benefit of these adaptive arrays is that their gain patterns can be modified through the adjustment of weights. An N element array, by adjusting the weight accorded to the signal received at each element, can create N-1 nulls in its gain pattern and effectively cancel out N-1 interfering signals. With two elements, a system of proper weighting can steer a null toward a single interference source, such as a personal computer directly or indirectly connected to the antenna array.

The above described adaptive antenna array systems all require a reference signal in the receiver, which is then compared to a correlated signal that is transmitted with the data. This reduces system efficiency in that it consumes space in the transmitted frame that might otherwise be used for the transmission of information. An improvement on this system is proposed in a paper entitled "Low-complexity Diversity Combining Algorithms and Circuit Architectures for Co-channel Interference Cancellation and Frequency-Selective Fading Mitigation," authored by P. B. Wong and D. C. Cox, published by the Center for Telecommunications, Stanford University, Stanford, Calif., and dated Feb. 6, 1996, a copy of which is attached hereto and which is incorporated herein by reference.

Wong and Cox dispense with the need for training sequences and reference signals by applying a search algorithm that maximizes the average opening of the eye pattern similar to that proposed by Chang and Sollenberger. In general terms, Wong and Cox propose applying complex weights to the signal from just one of the two branches in a two antenna array. The signal quality of the array output is then computed using the averaging opening of the eye pattern methodology proposed by Chang and Sollenbeger. The weighting amplitude and phase is then varied in "coarse" steps, i.e., the amplitude of the signal from that branch is varied by factors of ½, 1, and 2 and the phase is varied from 0 degrees to 270 degrees in 90 degree increments. For each combination of amplitude and phase, the average opening of the eye pattern is recomputed. The combination that yields the largest average eye opening is then selected and a "fine" search around that point is undertaken, i.e., the amplitude and phase are varied from that point in increments half the size of the preceding increments. Again, based on the average opening of the eye pattern, an optimal weight is selected. This is then the weight that is used. The problem is that this system requires extra circuitry in the receiver and/or imposes a significant computational and memory load on the receiver since the weights are calculated downstream in the receiver process after the RF signal has been demodulated into the transmitted symbols. Furthermore, utilization of an average eye opening methodology is problematic in digital systems with large or unknown apriori constellations (e.g., systems that will use one of two or more QAM modulation schemes depending upon the situation). During the coarse search the eye might be open only over a very narrow range of complex weights, or perhaps might never yield a significant opening. So there is a need for a way to adjust the weights that is more robust than analyzing the eye openings and which is independent from constellation type. Also, this is a system that is exclusively applicable to digital transmissions in that eye patterns are not available in an analog environment.

DESCRIPTION OF A PREFERRED EMBODIMENT

Generally, the present invention encompasses an apparatus and method for improved reception of a radio frequency (RF) signal in the face of wideband near-field electromagnetic interference. The apparatus includes an adaptive antenna array having a first and second antenna and a portable communication device. The first and second antennas of the array can be referred to as the reference branch and the auxiliary branch. A complex weight (amplitude and phase) is applied to the signal coming from the auxiliary branch. This weighted signal is then combined with the unweighted signal from the reference branch. The power spectrum of this signal is then analyzed in the receiver and its signal-to-noise ratio (SNR) is estimated by a ratio of the power in the signal channel to the power in upper and lower adjacent frequency bands. The SNR and the complex weights applied to the signal coming in from the auxiliary branch are then stored in memory. The weights are adjusted and the above procedure is repeated until the SNR for the combined signal is estimated and stored for a full range of amplitude and phase settings. The weights yielding the maximum estimated SNR are then selected and applied to subsequent signals from the auxiliary branch. In contrast to prior art, the present invention is a simple scheme that can be implemented with minimal enhancement to a digital receiver. The power in transmission channels is data that is already measured and calculated in many digital receivers and the power in adjacent frequency bands may also be an available measurement (it is already available in Motorola's "iDEN" products). The present invention looks at raw signal power prior to demodulation, which means that it can be part of an antenna structure as opposed to part of the receiver and also makes it applicable to an analog environment. Plus, the invention effectively detects and handles noise-dominated scenarios and in-band noise spurs.

Figure 3:
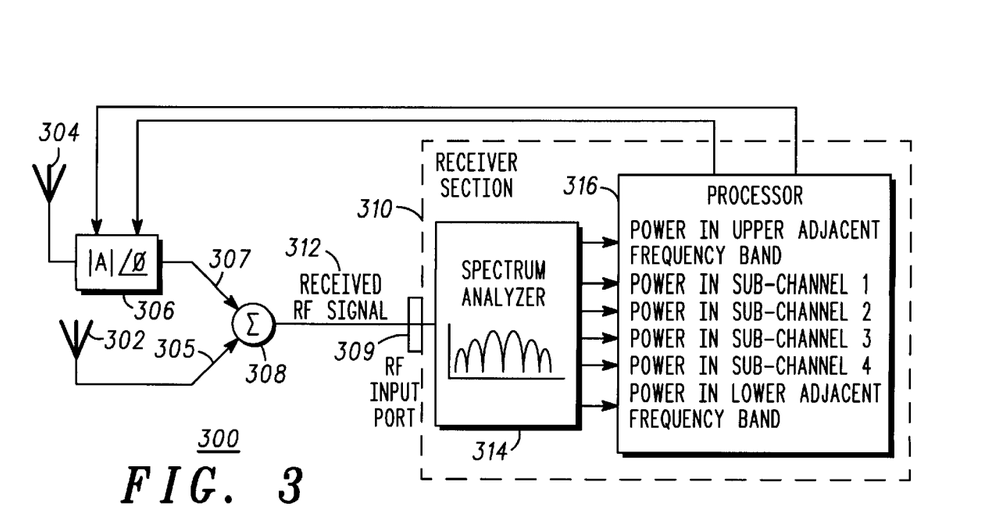
FIG. 3 is block diagram illustration of a communication device in accordance with the present invention.

The present invention can be more fully understood with reference to FIGS. 3–7. FIG. 3 illustrates a communication device 300 in accordance with a preferred embodiment of the present invention. The communication device 300 includes a first antenna 302, a second antenna 304, a summer 308, a weighter 306 coupled between the second antenna 304 and the second input to the summer 308, and a receiver section 310. The receiver section 310 comprises a RF input port 309 and a means for analyzing a spectrum of the RF input signal. In a preferred embodiment, the means for analyzing the spectrum of the RF input signal would comprise a spectrum analyzer 314 for analyzing the spectrum of the received RF signal 312, and a processor 316 for analyzing the output of the spectrum analyzer 314 and for providing a controlling input to the weighter 306. A desired signal and an interfering signal are available for reception at the first antenna 302 and at the second antenna 304. The desired signal and the interfering signal from the first antenna 302 and the weighted version of those signals from the second antenna 304 are combined in the summer 308, and the summer's output is a received RF signal 312. The received RF signal 312 is then fed to the receiver section 310 via the RF input port 309. By adjusting the weight applied in the weighter 306 to the signal coming from the second antenna 304 such that the interfering signal coming from that antenna approaches being 180 degrees out of phase and equal in amplitude to such an interfering signal coming from the first antenna 302 and simultaneously such that the strength of the desired signal is maximized, the interferer can be nearly nulled out in the summer 308 and the signal quality, i.e., SNR, can be maximized. Those skilled in the art appreciate that there are a variety of signal quality metrics. The use of SNR herein is meant to present to the reader an example of a signal quality metric to better illustrate the principles of the present invention.

The SNR is estimated by spectral analysis techniques. The spectrum of the received RF signal 312 is analyzed in the spectrum analyzer 314 in the receiver section 310. In the preferred embodiment, the spectrum analyzer 314 is a processor that performs a fast fourier transform (FFT) on the combined signal in order to determine its frequency components and their magnitudes. The magnitudes of the frequency components are then used to calculate the total power in the channel and in the upper and lower adjacent frequency bands, which are then transmitted to the processor 316. The processor 316 calculates the ratio of the in-band and adjacent band total power levels and stores this data, along with the amplitude and phase adjustments that were applied to the signal from the second antenna 304. The processor 316 then provides the next combination of amplitude and phase adjustments to the weighter 306 for application to the signal coming from the second antenna 304. Those skilled in the art appreciate that there are other well known spectral analysis techniques such as a discrete cosine transform to obtain the frequency spectrum of the received RF signal 312 and average power calculations for comparing in-band and adjacent band power levels. The use of FFT and total power herein is meant to present to the reader an example of a spectral analysis technique to better illustrate the principles of the present invention.

Figure 4:
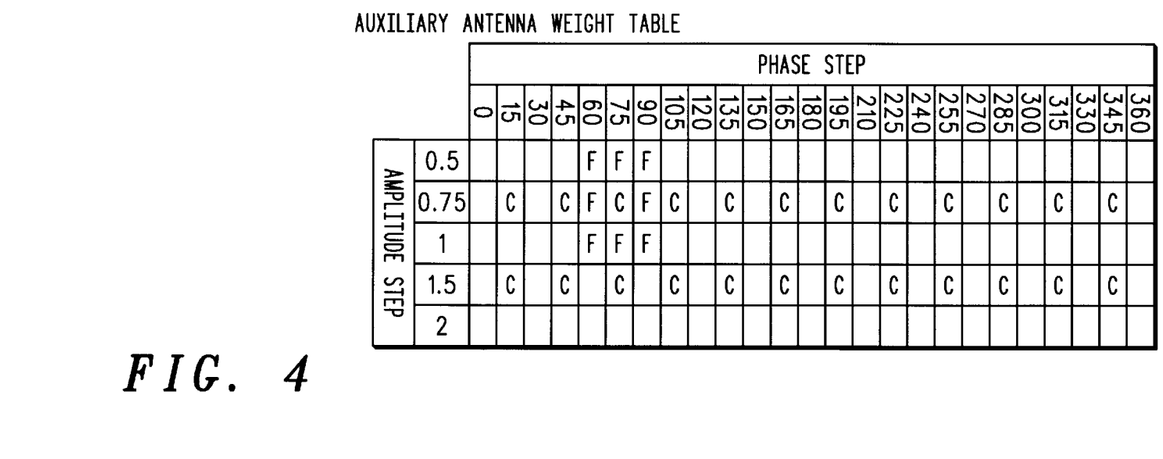
FIG. 4 is a tabular illustration of a searching technique in accordance with the present invention.

Adjusting the amplitude and phase in order to steer the null to cancel the interferer and in order to maximize the signal strength of the desired signal is effectuated by a two-stage search. FIG. 4 is a table illustrating a searching technique in accordance with a preferred embodiment of the present invention. In FIG. 4, the rows represent the amplitude adjustment applied to the signal coming from the second antenna 304 and the columns represent the phase adjustment. In the first stage, the "coarse" search, the phase is varied from 15 degrees to 345 degrees in 30 degree increments and the amplitude is varied by factors of ¾ and 1½. Hence the weights are set at 12 different phases and two different amplitudes. These combinations are represented by the squares filled with the letter "C" in FIG. 4. For each combination of amplitude and phase, an estimation of SNR is made by the processor 316. After the coarse search is completed, the processor 316 selects the combination yielding the maximum SNR and stores this in memory, along with the estimate of SNR. Then a second stage, or "fine," search is undertaken in which the phase is varied by −15, 0, and +15 degrees and the amplitude is varied by factors of ⅔, 1, and ⁴⁄₃ from the weights that yielded the maximum SNR in the coarse search. These combinations are represented by the squares filled with the letter "F" in FIG. 4. Again, an estimation of SNR is made by the processor 316 for each combination and the combination yielding the maximum SNR ratio is selected by the processor 316 as the optimal weight. The communication device will then enter a tracking mode whereby the processor 316, in conjunction with the spectrum analyzer 314, will continue to monitor the SNR and if the SNR degrades below a specified amount (e.g., 6 dB) then the search for optimal weights will be reinitiated. Those who are skilled in the art will realize that there are other search techniques such as other step and repeat searches or gradient searches, that can be utilized here without departing from the spirit and scope of the present invention as defined by the appended claims. It may also be possible to reduce the search space based on apriori knowledge of the array orientation with respect to the noise source or based on results from a previous search (e.g., have selected optimal/best complex weight values in a previous search and now, if search again, just do a fine search around those optimal/best values).

As described above, an antenna array comprising a plurality of antennas receives a desired signal and an interfering signal. The unweighted desired and interfering signals from a first antenna 302 are then combined in a summer 308 with the weighted versions of the signals from a second antenna 304 to produce a received RF signal 312. The SNR of the received RF signal 312 is then estimated using a spectral analysis technique. This estimate, along with the weights applied to the signal from the second antenna 304, is then stored. Utilizing feedback and a methodology for searching through a range of sets of complex weights, the weights optimizing the SNR are determined and used to weight subsequent signals from the second antenna 304. In this way the antenna array's gain pattern is adjusted so that a null is steered to cancel out the interferer and the diversity gain is steered toward the direction of the desired signal. The communication device then enters a tracking mode whereby the processor 316 will continue to monitor the SNR and if the SNR degrades below a specified amount then the search for optimal weights will be reinitiated.

Figure 5:
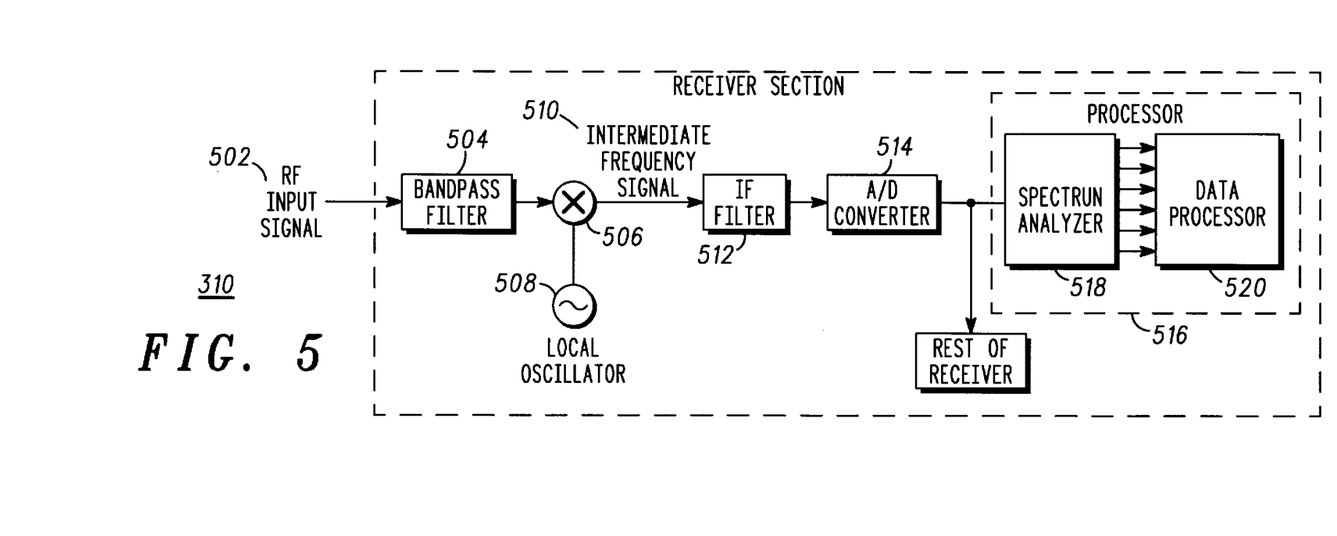
FIG. 5 is block diagram illustration of a receiver section for use in the communication device in accordance with the present invention.

FIG. 5 illustrates an alternate embodiment of a receiver section 310 in accordance with the present invention. In FIG. 5, the receiver section 310 comprises a bandpass filter 504, a local oscillator 508, a mixer 506, an intermediate frequency (IF) filter 512, an analog-to-digital (A/D) converter 514, a processor 516, and the remainder of the receiver. The processor 516 comprises a spectrum analyzer 518 and a data processor 520. In a second alternate embodiment of a receiver section 310, the spectrum analyzer 518 would precede the processor 516 and would be coupled between the A/D converter 514 and the processor 516. A RF input signal 502 is first input into the bandpass filter 504 in the receiver section 310. The bandpass filter 504 attenuates most of the RF input signal 502 that is outside of the transmission channel. The output of the bandpass filter 504 is then mixed in the mixer 506 with a signal from the local oscillator 508 and an IF signal 510 is generated. The IF signal 510 then passes through the IF filter 512, which sharply attenuates all of the IF signal 510 outside of the IF signal bandwidth and upper and lower adjacent frequency bands. The IF filter 512 output is fed to the A/D converter 514, and the output of the A/D converter 514 is then fed to the spectrum analyzer 518. The spectrum analyzer 518 provides data on the in-band and adjacent frequency band power levels to the data processor 520 and the data processor 520 makes power level computations, estimates the SNR, stores the estimated SNR and associated complex weights and communicates with the weighter concerning the next set of complex weights.

Figure 6:
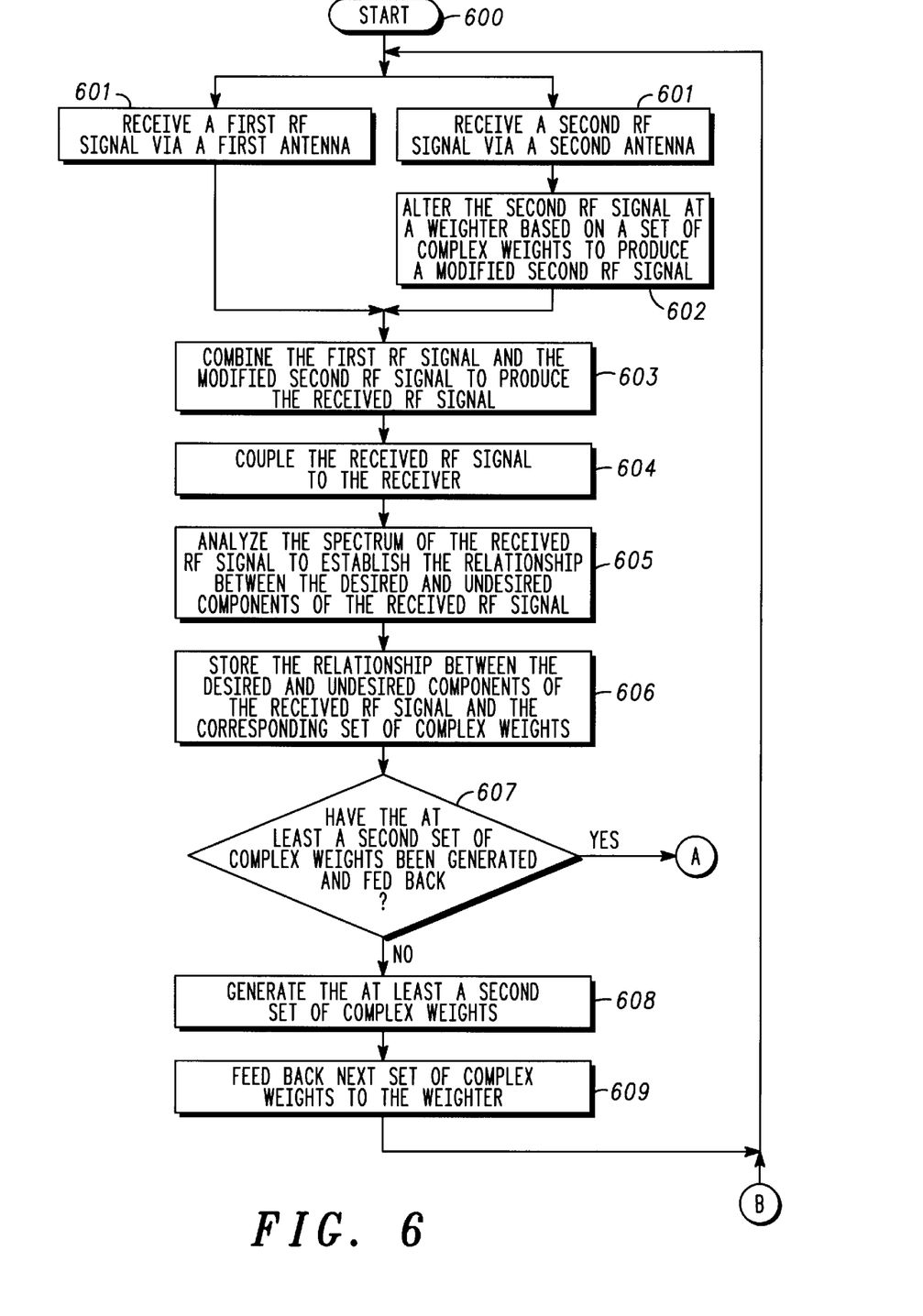
FIG. 6 is a logic flow diagram illustration of steps executed by a communication device to maximize the signal-to-noise ratio of a received RF signal in accordance with the present invention.

FIG. 6 illustrates a logic flow diagram of the steps executed by a communication device that is coupled to a computing device in order to maximize the SNR of a received RF signal in accordance with a preferred embodiment of the present invention. The logic flow begins (600) with a reception of a first RF signal via a first antenna and a reception of a second RF signal via a second antenna (601). The second RF signal is then altered based on a first set of complex weights by a weighter to produce a modified second RF signal (602). The first RF signal and the modified second RF signal are then combined to produce the received RF signal (603). The received RF signal is then coupled to a receiver (604), where the spectrum of the received RF signal is analyzed to establish the relationship between desired and undesired components of the received RF signal (605). The relationship between the desired and undesired components of the received RF signal and the corresponding set of complex weights are then stored (606), and at least a second set of complex weights are generated (608). The at least a second set of complex weights are then fed back to the weighter (609) and this process is rerun from the point of the reception of a first RF signal via a first antenna and the reception of a second RF signal via a second antenna (601). After this process has been run with all desired sets of complex weights (607), one of the sets of complex weights is selected based on the stored relationships between desired and undesired components of the received RF signals (610), preferably a set that optimizes the relationship. The selected set of complex weights is then fed back to the weighter (611) in order to maximize the relationship between desired and undesired components of subsequently received RF signals and hence minimize thereon the impact of noise generated by the computing device. The communication device will then enter a tracking mode (612, 613), whereby it will monitor the relationship between desired and undesired components of the subsequently received RF signals (612) and if the relationship degrades below a specified amount (e.g., 6dB) then the search for an optimal set of complex weights will be reinitiated from step (601) (613).

The measured relationship between the desired and undesired components of the received RF signal is an estimate of the signal's SNR. The searching algorithm applies a broad range of sets of weights to the signal received from the second antenna and, after combining the modified signal from the second antenna with the unmodified signal from the first antenna, estimates the SNR of the resulting received RF signal using a spectral analysis approach. The weights that yield the maximum estimated SNR are then the weights selected for use in altering subsequent signals received via the second antenna.

In an alternate embodiment of the present invention as shown in FIG. 6, the step of analyzing the spectrum of the received RF signal (605) includes the step of comparing the power of the desired component with the power of the undesired component adjacent to the desired component. For example, the total power of the signal in the transmission channel (P_inner) would be compared to the total power in the two adjacent frequency bands (adjacent to the transmission channel) (P_outer). The ratio of P_inner to P_outer would be used as an estimate of SNR.

Figure 7:
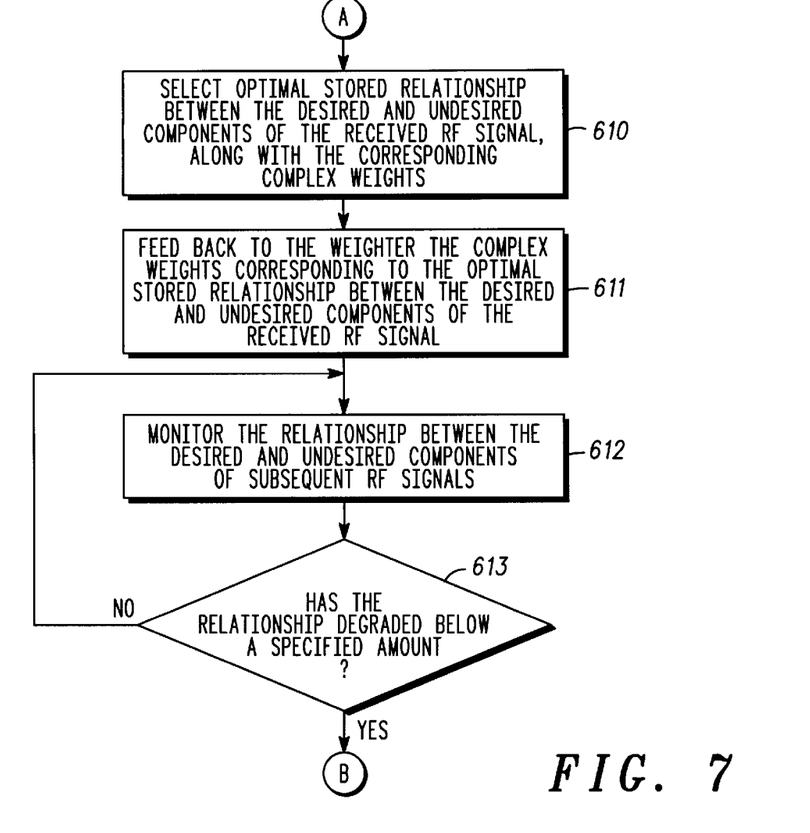
FIG. 7 is an illustration of a frequency spectrum of in-band and adjacent channel power in accordance with the present invention.

Some digital modulation schemes, for example, multi-carrier modulation schemes, may subdivide the transmission channel up into n sub-channels. Therefore, in a second alternate embodiment of the present invention as shown in FIG. 6, the step of analyzing the spectrum of the received RF signal (605) would include the step of estimating SNR by calculating the total power in the n-1 smallest (power-wise) of the n sub-channels (P_inner) and comparing it to the power in the two adjacent sub-channels (adjacent to the transmission channel) (P_outer). FIG. 7 illustrates this step in a situation where there are four sub-channels in the transmission channel (inner sub-channel #'s 1 through 4) and two adjacent sub-channels (outer sub-channel #'s 1 and 2). The in-band spur located in inner sub-channel #2 could cause a mischaracterization of the total in-band power and SNR for this particular set of complex weights. In-band spurs are undesired noise, yet they could cause an unusually high power level reading of what appears to be desired power because the spur is in-band. Dropping the sub-channel with the highest power reading from the in-band power totals should minimize the distorting impact of such a spur.

Ordinarily, the goal here would be to maximize the ratio of P_inner-to-P_outer. However, in a noise-dominated scenario, the difference between the maximum and minimum ratios could be very small, for example less than 5 dB. In such an event, the P_inner determination may not accurately reflect the signal strength but rather noise power, so maximizing P_inner to P_outer would not be appropriate. Instead, the goal would then be to just minimize P_outer.

Figure 8:
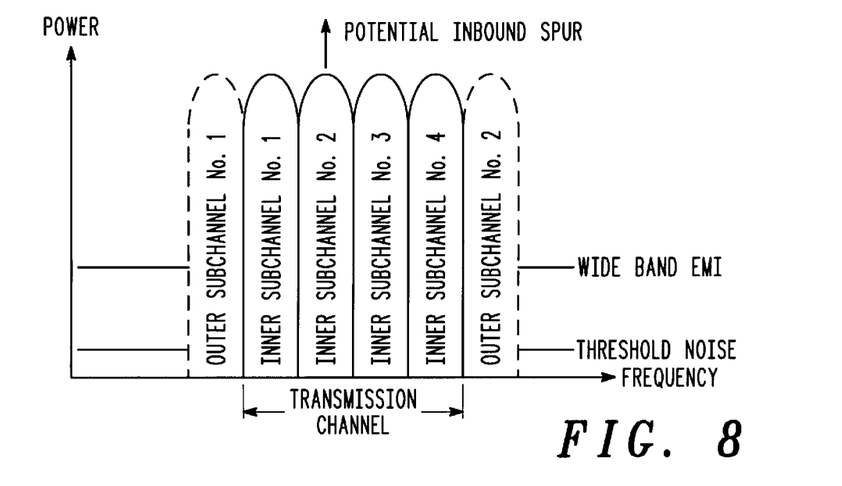
FIG. 8 is a logic flow diagram illustration of steps executed by a multi-antenna communication device to improve the signal-to-noise ratio of a received RF signal in accordance with the present invention

FIG. 8 illustrates a logic flow diagram of the steps executed by a communication device that is coupled to a computing device in order to maximize the SNR of a received RF signal in accordance with a preferred embodiment of the present invention. The logic flow begins (800) with a reception of a first RF signal via a first antenna and a reception of a second RF signal via a second antenna, which first and second RF signals have phase and amplitude components (801). The first RF signal and the second RF signal are then combined in a summer to produce a first received RF signal (802). The spectrum of the first received RF signal is analyzed to determine a first SNR (803). This SNR is then stored (804), and a set of complex weighting factors are generated (805). Next, a third RF signal is received via the first antenna and a fourth RF signal is received via the second antenna, which third and fourth RF signals have phase and amplitude components (806). The fourth RF signal is then altered based on the set of complex weighting factors, producing an altered RF signal (807). The third RF signal and the altered RF signal are then combined in the summer to produce a second received RF signal (808). The spectrum of the second received RF signal is then analyzed to determine a second SNR (809), which second SNR and corresponding set of complex weighting factors are then stored (810). The first SNR is then compared to the second SNR (811). If the first SNR is greater than the second SNR, then a fifth and sixth, and subsequent, RF signal received via the first and second antennas, respectively, will not be altered (812). If the second SNR is greater than the first SNR, then for a fifth and sixth RF signal received via the first and second antennas, respectively, the sixth RF signal will be altered based on the set of complex weighting factors before being combined with the fifth RF signal in the summer to produce a received RF signal (812). The communication device will then enter a tracking mode (813, 814), whereby it will monitor the SNR (813) and if the SNR degrades below a specified amount (e.g., 6 dB) then the search will be reinitiated from step (801) (813). In an alternate embodiment of the present invention, steps (806) through (811) can be repeated for RF signals subsequently received via the first and second antennas to iteratively improve the SNR of a received RF signal.

The present invention encompasses an apparatus and method for improved reception of an RF signal in the face of wideband near-field electromagnetic interference. With this invention, weights are applied to a signal coming from an auxiliary branch of a multiple element adaptive antenna array. This weighted signal is then combined with an unweighted signal from a reference branch and a spectral analysis technique is used to estimate the SNR for the combined signal. A search technique is utilized to both optimize this estimate of the SNR and to determine the weights to apply to subsequent signals from the auxiliary antenna. The present invention is a simple scheme that can be implemented with minimal enhancement to a digital receiver. The power in transmission channels is data that is already measured and calculated in digital receivers and the power in adjacent channels is likely to also be an available measurement. The present invention looks at raw signal power prior to demodulation, which means that it can be part of an antenna structure as opposed to part of the receiver and also makes it applicable to an analog environment. Plus, the invention can effectively detect and handle noise-dominated scenarios and, by using the spectral analysis technique to measure signal power in sub-channels within the transmission channel, can also effectively deal with in-band noise spurs.

While the present invention has been particularly shown and described with reference to particular embodiments thereof, it will be understood by those skilled in the art that various changes in form and details may be made therein without departing from the spirit and scope of the present invention.

We claim:

1. In a communication device coupled to a computing device, a method of receiving a radio frequency (RF) signal using a plurality of antennas, comprising:
   a) receiving a first RF signal via a first antenna;
   b) receiving a second RF signal via a second antenna;
   c) altering the second RF ignal at a weighter based on a first set of complex weights to produce a modified second RF signal;
   d) combining the first RF signal and the modified second RF signal to produce a received RF signal;
   e) coupling the received RF signal to a receiver;
   f) analyzing a spectrum of the received RF signal to establish a relationship between desired and undesired components of the received RF signal;
   g) storing the relationship between desired and undesired components of the received RF signal and the first set of complex weights;
   h) generating at least a second set of complex weights;
   i) feeding back the at least a second set of complex weights to the weighter;
   j) repeating steps (a) through (g) for the at least a second set of complex weights;
   k) selecting a set of complex weights from the first set of complex weights and the at least a second set of complex weights based on the stored relationships between desired and undesired components of the received RF signals to produce a selected set of complex weights; and
   l) applying the selected set of complex weights to RF signals subsequently received by the first and second antennas.

2. The method of claim 1, wherein step (i) comprises altering a phase of the second RF signal to produce a modified second RF signal.

3. The method of claim 1, wherein step (c) comprises altering an amplitude of the second RF signal at a weighter to produce a modified second RF signal.

4. The method of claim 1, wherein step (c) comprises altering a phase of the second RF signal at a weighter to produce a modified second RF signal.

5. The method of claim 1, wherein step (f) includes the step of comparing a power of a desired component with a power of an undesired component adjacent to the desired component.

6. The method of claim 1, wherein the method further comprises the step of monitoring the relationship between desired and undesired components of the received RF signal and repeating steps (a) through (l) should the relationship degrade below a specified amount.

7. A method of improving the signal to noise ratio of a received signal in a multi-antenna communication device, comprising:
   a) receiving a first radio frequency (RF) signal via a first antenna, the first RF signal having phase and amplitude components;
   b) receiving a second RF signal via a second antenna, the second RF signal having phase and amplitude components;
   c) combining the first RF signal with the second RF signal in a summer to produce a first received RF signal;
   d) analyzing a spectrum of the first received RF signal to determine a first signal-to-noise ratio thereof;
   e) storing the first signal-to-noise ratio;
   f) generating a set of complex weighting factors;
   g) receiving a third RF signal via the first antenna, the third RF signal having phase and amplitude components;
   h) receiving a fourth RF signal via the second antenna, the fourth RF signal having phase and amplitude components;
   i) altering the fourth RF signal based on the set of complex weighting factors to produce an altered RF signal;

j) combining the third RF signal with the altered RF signal in a summer to produce a second received RF signal;

k) analyzing a spectrum of the second received RF signal to determine a second signal-to-noise ratio;

l) storing the second signal-to-noise ratio and the set of complex weighting factors;

m) comparing the first signal-to-noise ratio and the second signal-to-noise ratio;

n) when the first signal-to-noise ratio is greater than the second signal-to-noise ratio, receiving a fifth RF signal via the first antenna and a sixth RF signal via the second antenna; and o) when the second signal-to-noise ratio is greater than the first signal-to-noise ratio, receiving a fifth RF signal via the first antenna and a sixth RF signal via the second antenna, which sixth RF signal is altered based on the set of complex weighting factors before being combined with the fifth RF signal in the summer to produce a received RF signal.

8. The method of claim 7, wherein step (i) comprises altering an amplitude of the second RF signal to produce a modified second RF signal.

9. The method of claim 7, wherein the method further comprises the step of monitoring a signal-to-noise ratio of the received RF signal and repeating steps (a) through (o) should the signal-to-noise ratio degrade below a specified amount.

10. A communication device, comprising:

an antenna system coupled to a radio frequency (RF) input port for coupling thereto a combined RF signal, the antenna system comprising:

a summer having first and second inputs for coupling to the receiver section the combined RF signal;

a first antenna for coupling a first RF signal to the first input;

a second antenna for receiving a second RF signal; and a weighter coupled between the second antenna and the second input of the summer and having a control input from the receiver section for adjusting a weight of the second RF signal;

a receiver section comprising:

the RF input port; and a processor for:

analyzing a spectrum of the combined RF signal to establish a relationship between desired and undesired components of the combined RF signal;

storing the relationship between desired and undesired components of the combined RF signal and the first set of complex weights;

generating at least a second set of complex weights;

feeding back the at least a second set of complex weights to the weighter via the control input to the weighter to produce at least a second combined RF signal whose spectrum is analyzed and relationships stored as for the combined RF signal;

selecting a set of complex weights from the first set of complex weights and the at least a second set of complex weights based on the stored relationships between desired and undesired components of the combined RF signals to produce a selected set of complex weights; and applying the selected set of complex weights to RF signals subsequently received by the first and second antennas via the control input to the weighter.

\* \* \* \* \*